March 27, 1945. O. D. SMITH ET AL 2,372,342
BELT DRIVE FOR MACHINE TOOLS
Filed Sept. 18, 1943 2 Sheets-Sheet 1
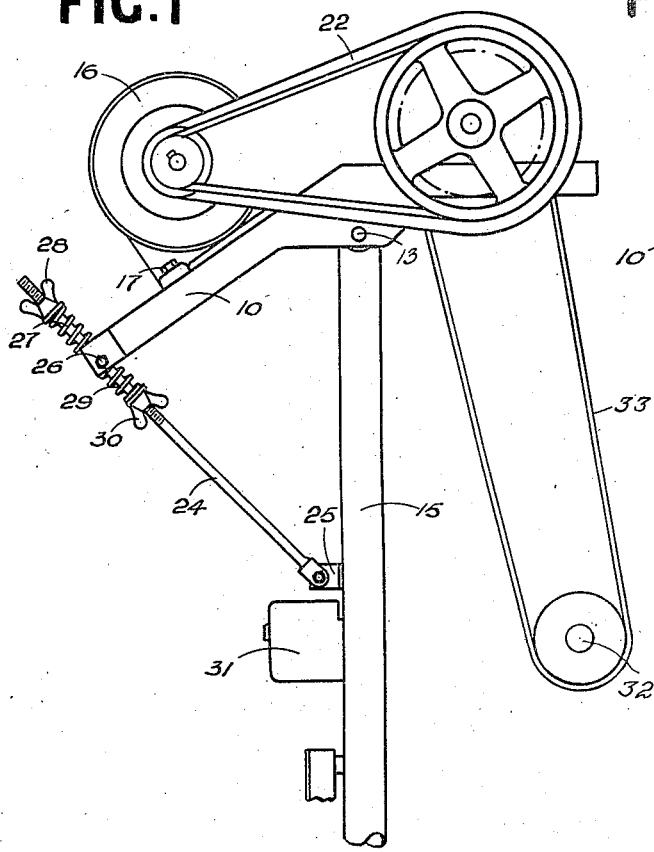
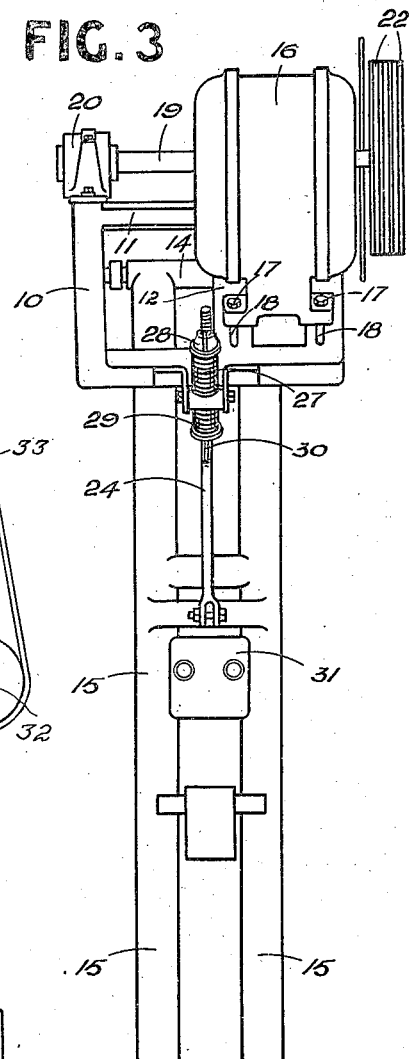
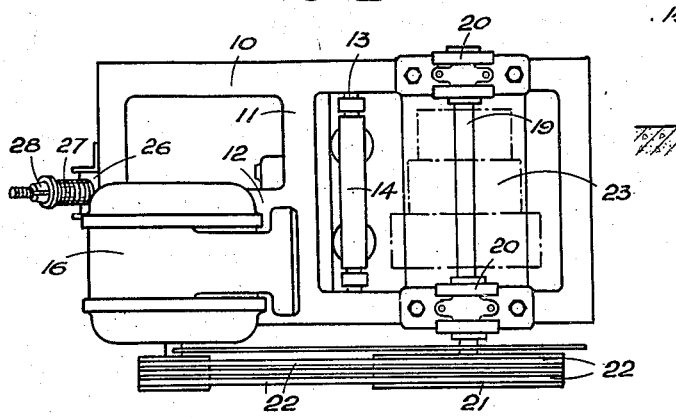
Inventors:
Oliver Douglas Smith &
Christopher Webb.
by Walter S. Bleston
ATTORNEY

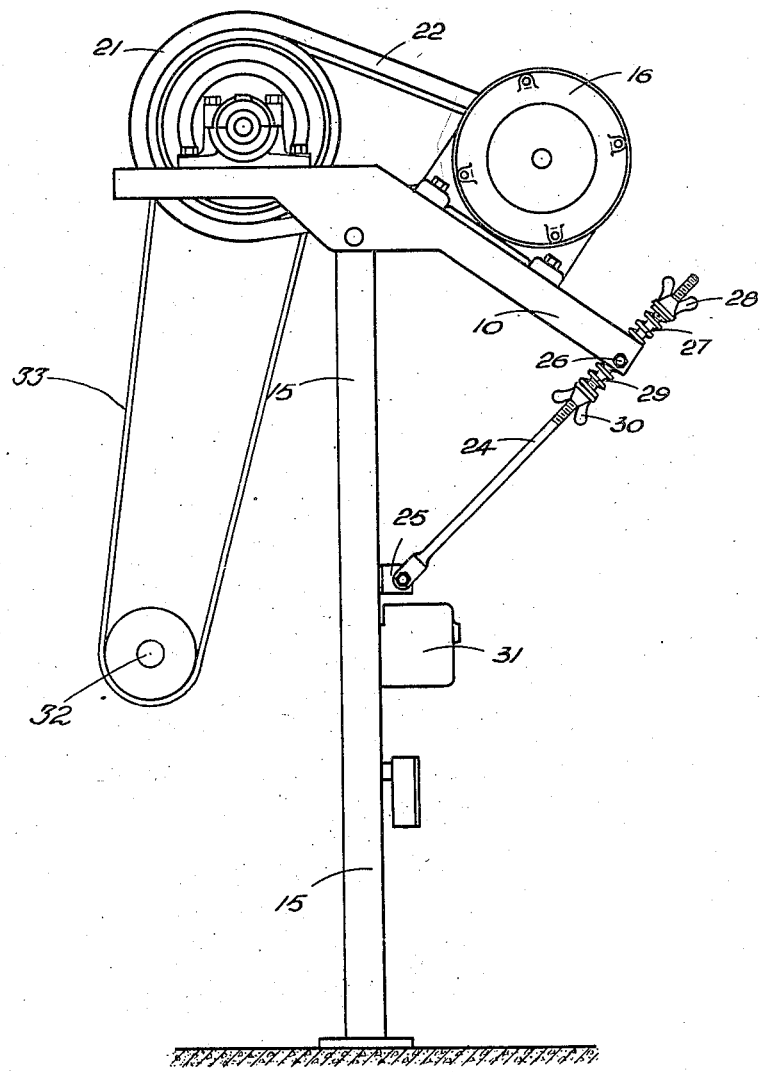

Patented Mar. 27, 1945

2,372,342

UNITED STATES PATENT OFFICE 2,372,342

BELT DRIVE FOR MACHINE TOOLS

Oliver Douglas Smith and Christopher Webb, Birmingham, England

Application September 18, 1943, Serial No. 502,930
In Great Britain June 9, 1942

6 Claims. (Cl. 74—242.15)

This invention relates to improvements in belt drives for machine tools for working metals, wood or any other materials.

Where a machine is not a self-contained unit having an electric motor or other driving means incorporated with it, it is usually driven by belting from an overhead line shaft with or without an intermediate countershaft according to whether or not the machine has to be driven at different speeds. This method of driving has a number of disadvantages in practice. One of these is that the roof of the shop or the supporting structure for the roof has to be of sufficient strength and rigidity to carry the line shafting. Another is that where a number of machines are driven from a single shaft and only one machine is in use considerable power is wasted in driving the shaft, in addition to which a motor having the capacity to drive all the machines is being used to drive one. Other disadvantages are that long belts are required at considerable cost, and maintenance of the overhead shafts and belting is extravagant in labor.

One object of our invention is to provide an improved form of independent drive for machine tools which eliminates the need for overhead shafting, is low in initial cost and simple to maintain and can be readily applied to almost any machine tool.

A belt drive unit for machine tools according to our invention comprises a skeleton frame pivoted to oscillate about an axis parallel to that of the shaft to be driven, a driving motor and countershaft driven thereby mounted on the frame in such a manner that the weight of the motor tensions a belt transmitting the drive from the countershaft to the driven shaft of the machine, and spring means for regulating the tensioning force.

As the tension of the belt by which the machine is driven is maintained constant a relatively short belt can be used without causing excessive bearing wear so that the cost of the belting is correspondingly reduced and the whole unit can be made extremely compact so that it can readily be fitted to existing machines without requiring increased spacing between adjacent machines.

The frame may be pivoted directly on the machine itself by means of a bracket or brackets or the like when the machine is suitable for this, or alternatively it may be mounted on a pillar or column or on a pair of pillars or columns extending up from the floor adjacent to the machine, or on any other suitable mounting.

Where the machine is fitted with a stepped or coned pulley the countershaft will be fitted with a complementary stepped or coned pulley and means may be provided for temporarily relieving the tension of the belt while it is being shifted from one pair of pulley surfaces to another. Such means may, for example, comprise a rotatable cam operated by a handle and adapted in one position to support the loaded end of the frame or to depress the other end, or it may comprise a rod and draglink mechanism for temporarily supporting the weight of the motor.

The automatic tensioning of the belt takes care of any lack of truth in the pulleys or irregularities in the belt so that the belt is never put under excessive tension, and by adjustment of the spring regulating means the tension can be kept to the lowest figure which is possible without belt slip. In this way the regulation of the belt tension for varying loads is obtained automatically with a consequent increase in the life of the belt.

The angular movement of the frame about its pivotal axis is very small so that the frame can readily be mounted to oscillate on bonded rubber bushes, and friction and wear at this point are eliminated as well as the necessity for lubrication.

One practical form of driving unit for a machine tool in accordance with our invention is illustrated by way of example in the accompanying drawings, in which:

Figure 1 is an end elevation of the complete unit and its mounting.

Figure 2 is a plan.

Figure 3 is a front elevation.

Figure 4 is an end elevation looking in the opposite direction to Figure 1.

In the arrangement illustrated 10 is the frame of the unit which may be a casting or may be built up from two or more castings or from rolled steel sections, or manipulated tube or other construction. The frame is of skeleton rectangular outline in plan with a cross-member 11 at about the middle of its length and a longitudinal member 12 extending between the member 11 and one end of the frame which for convenience will be hereinafter referred to as the rear end.

In side elevation the frame is cranked as shown in Figure 1, the front part in the normal position of the unit being substantially horizontal while the rear part is downwardly inclined. The central parts of the side members are increased in depth as shown best in Figure 4 to stiffen the frame and to receive the ends of a horizontal shaft 13 about which the frame is adapted to rock. The shaft 13 extends through a tubular bearing bracket 14 rigidly mounted on the upper end of a tubular built-up vertical column 15 adapted to be fixed to the floor at the back of a machine tool or in any other convenient position adjacent the machine. The frame 10 may be arranged to rock on bearings on the shaft 13 which is fixed at its ends in the bracket or the shaft may be fixed in the frame and rock in bearings in the bracket, and the bearings may be plain metal bushes, ball or roller bearings, or bonded rubber bushes as desired.

An electric motor 16 is mounted on the rear part of the frame by means of bolts 17 passing through slots 18 in the member 12 and in one side member of the frame so that the motor can be adjusted longitudinally on the frame for tensioning the primary belt drive. The motor drives through belting a countershaft 19 rotatably mounted in self-aligning journal bearings 20 adjacent the front of the frame. In the unit illustrated the countershaft has a multiple grooved pulley 21 on one end which is driven from the motor by three V belts 22 as this arrangement gives a very positive drive and requires a minimum of adjustment, but a single V belt or flat belt may be used instead.

A stepped or coned pulley 23 on the shaft 19 is adapted to receive a belt for driving the machine.

The position of the driving unit relative to the machine will usually be such that the countershaft 19 lies above and parallel to the machine shaft indicated at 32 and which is driven from the countershaft by a relatively short belt 33, and the weight of the motor on the rear end of the frame tending to rock the frame about the shaft 13 and carry the countershaft upwardly automatically keeps the belt tensioned.

The degree of tension of the belt is controlled by a spring on a rod 24 pivotally connected at its lower end to a lug 25 on the column 15. The upper end of the rod which is screw-threaded extends through a lug 26 pivotally mounted on the rear end of the frame, and a compression spring 29 is fitted over the rod below the lug between the lug and a wing-nut 30 screwed on to the rod. By adjustment of the wing-nut the degree of compression of the spring and hence the extent to which the weight of the motor is counter-balanced by the spring can be varied.

A further adjustably loaded compression spring 27 is preferably fitted over the rod between the upper surface of the lug 26 and a wing-nut 28 to check rebound or excessive upward movement of the rear end of the frame.

A positive stop may be provided for the adjustment to prevent the machine operator from over-tightening the belt.

To facilitate belt shifting any convenient means may be provided for rocking the frame of the unit to relieve the tension of the belt.

A switch 31 for controlling the motor 16 may be mounted as shown on the column 15 at a convenient height for the operator.

The unit illustrated is designed for use where the machine to be driven has no convenient point on which the frame of the unit can be pivotally mounted in correct relationship to the driven shaft of the machine but it will be understood that where the design of the machine permits the driving unit may be mounted on the machine itself.

We claim:

1. A belt driving unit for a shaft of a machine tool comprising a frame pivoted to rock about an axis parallel to that of said shaft, a motor and a countershaft driven thereby mounted on the frame on opposite sides of the rocking axis so as to cause oppositely directed torques about said axis owing to their weight, and having their axes parallel to said axis, a pulley on the countershaft to receive a belt for driving the machine shaft and spring means for controlling the rocking movement of the frame about its axis.

2. A belt driving unit for a shaft of a machine tool comprising a frame pivotally mounted on the machine to rock about an axis parallel to that of the shaft, a driving motor and a countershaft driven thereby mounted on said frame on opposite sides of the rocking axis and having their axes parallel to said axis, a pulley on the countershaft to receive a belt for driving the machine shaft, the weights of the motor and countershaft applying to the frame torques tending to rock the frame about its axis in opposite directions and the torque due to the motor being greater than that due to the countershaft and tending to rock the frame in a direction to tension said belt, and spring means for regulating the belt tensioning effect.

3. A belt driving unit for a shaft of a machine tool comprising a column adapted to be secured to the floor adjacent the machine, a frame pivotally mounted on said column to rock about an axis parallel to that of the shaft, a driving motor and a countershaft driven thereby mounted on said frame, a pulley on the countershaft to receive a belt for driving the machine shaft, the weights of the motor and countershaft applying to the frame torques tending to rock the frame about its axis in opposite directions and the torque due to the motor being greater than that due to the countershaft and tending to rock the frame in a direction to tension said belt, and spring means for regulating the belt tensioning effect.

4. A belt driving unit for a shaft of a machine tool comprising a frame pivoted to rock about an axis parallel to that of the shaft, a driving motor and a countershaft mounted on said frame with their axes parallel to the rocking axis of the frame, a belt drive from the motor to the countershaft, means for adjusting the motor on the frame towards and away from the countershaft, a pulley on the countershaft to receive a belt for driving the machine shaft, the weights of the motor and countershaft applying to the frame torques tending to rock the frame about its axis in opposite directions and the torque due to the motor being greater than that due to the countershaft and tending to rock the frame in a direction to tension said belt, and spring means for regulating the belt tensioning effect.

5. A belt driving unit as claimed in claim 1 in which the spring means for regulating the belt tensioning effect comprises a lug on the frame, a rod pivotally connected at one end to a fixed point and extending upwardly through said lug, a nut adjustably screwed onto the rod, and a compression spring on the rod between said lug and nut.

6. A belt driving unit for a shaft of a machine tool as claimed in claim 1 in which the spring means for regulating the belt tensioning effect comprises a lug on the frame, a rod pivotally connected at one end to a fixed point and extending upwardly through said lug, nuts adjustably screwed on to said rod above and below said lug, and a compression spring on the rod between each of said nuts and said lug.

OLIVER DOUGLAS SMITH.
CHRISTOPHER WEBB.